No. 607,006. Patented July 5, 1898.
R. FAAS & H. S. GRAY.
ARMOR FOR PNEUMATIC TIRES.
(Application filed May 9, 1898.)

(No Model.)

Witnesses
J. Halpenny
J. G. VanGilder

Inventors
Rudolph Faas
Herbert S. Gray
By H. C. Hunsberger
Atty

UNITED STATES PATENT OFFICE.

RUDOLPH FAAS AND HERBERT S. GRAY, OF CHICAGO, ILLINOIS, ASSIGNORS TO THE NO-PUNCTURE TIRE COMPANY, OF SAME PLACE.

ARMOR FOR PNEUMATIC TIRES.

SPECIFICATION forming part of Letters Patent No. 607,006, dated July 5, 1898.

Application filed May 9, 1898. Serial No. 680,209. (No model.)

*To all whom it may concern:*

Be it known that we, RUDOLPH FAAS and HERBERT S. GRAY, citizens of the United States, residing at Chicago, county of Cook, and State of Illinois, have invented a new and useful Improvement in Armors for Pneumatic Tires, of which the following is a specification.

Our improvement relates to that class of tires that are inflatable and may be composed of an outer casing and an inner inflatable tube or may be applied to a tire composed of a single tube as a means for protecting the tire from injuries incident to puncture.

Our objects are to provide an impenetrable fabric that if placed between the inner tube and outer casing will protect the inner tube from injury or if placed in the tube of a single tire will resist the attack of external objects that would otherwise pierce the inflatable tire and cause it to collapse. This armor inserted in any tire does not injure or abrade the walls of the tire, nor does it affect the life or resiliency of the tire or add materially to its weight.

The device is illustrated in the accompanying drawings, in which—

Figure 1:
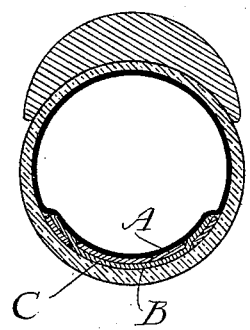
Figure 2:
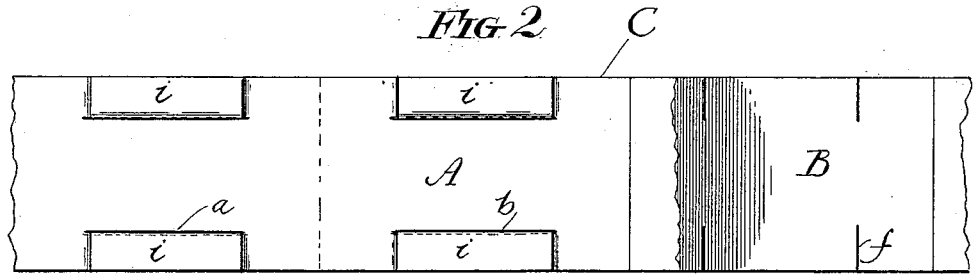
Figure 3:
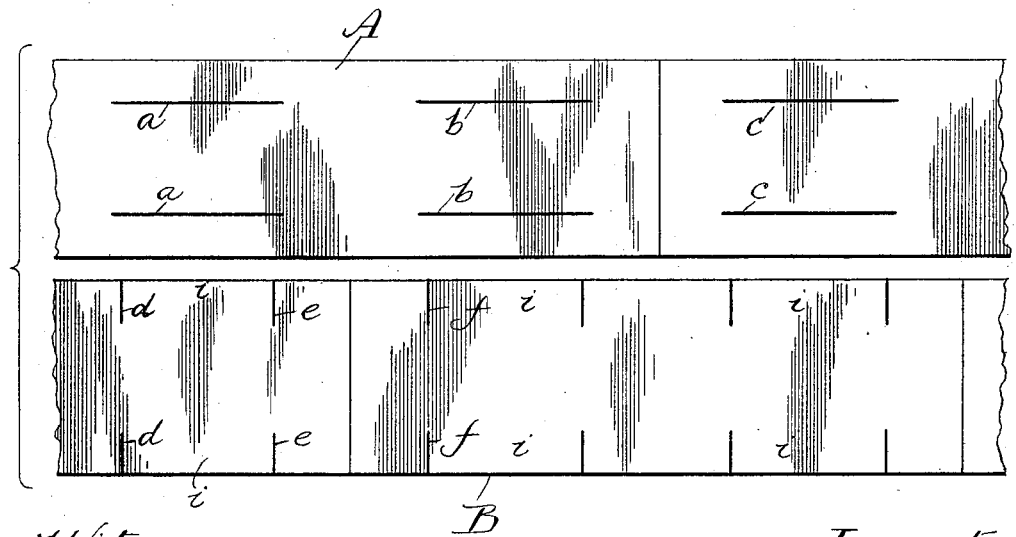

Figure 1 is a transverse section of a tire containing the armor. Fig. 2 is a section of the armor with a portion of one of the strips removed. Fig. 3 is a plan view showing the manner of cutting the strips.

Similar letters refer to similar parts throughout the several views.

In the construction of the armor we use an impenetrable fabric which is cut into strips about six inches in length by one and a half or two inches in width, the width being regulated by the size of the tire and varies accordingly. These strips are then cut and articulated, as shown by Fig. 3. The strip A is cut longitudinally, as $a\ b\ c$. The incisions are about one and one-half to two inches in length and about one-fourth of an inch inside of the two edges, all the incisions on either side being in line with and opposite each other and about one and one-half to two inches apart, thus leaving a solid or unbroken central strip. The strip B is cut transversely at intervals of one and one-half to two inches, as $d\ e\ f$, corresponding with the incisions in the strip A. These transverse cuts $d\ e\ f$ extend inwardly about one-fourth of an inch from the two edges of the strip. The lateral incisions in the strip A and transverse cuts in the strip B are all directly opposite each other, leaving in both strips unbroken central strips. The strips A and B, prepared as above described, are then joined together to double the thickness of the armor by inserting the portions $i\ i\ i$ of the strip B through the incisions $a\ b\ c$ in the strip A, as shown in Fig. 2.

The strips in the construction of the armor are so arranged that the third joint in the first strip overlaps the second, so as to connect the third strip, and so continues consecutively until a sufficient length has been constructed to complete the tire, when the last joint of the last strip is brought around to connect with the first joint of the first strip, thus completing the armor. The incisions $a\ b\ c$ in the strip A are just a trifle longer than the cut portions $i\ i\ i$ in the strip B to allow a slight longitudinal expansion or movement. The armor thus constructed is then given a coat of rubber paint to fill the interstices or web of the fabric. The armor C thus prepared is inserted between the inner inflatable tube and outer casing, so as to protect the tread of the tire. The armor may also be arranged to be placed in a single inflatable tube, if desired, by means of a rubber casing attached to the inner walls of the tube.

Having thus described our invention, what we claim as new, and desire to protect by Letters Patent, is—

1. In an armor for pneumatic tires an impenetrable fabric cut into short narrow strips joined together consecutively by lateral incisions near the edges at regular intervals at points opposite each other alternately with similar strips cut transversely from the edges toward the center to permit the portions of the edges of the latter to be inserted into the incisions of the former, the joints overlapping as described.

2. In an armor for pneumatic tires, a short narrow strip A, of fabric having lateral incisions at opposite points near the edges, a strip B, having short transverse incisions from the edges toward the center, the incisions in the strip A, adapted to permit the cut edges of the strip B, to be inserted therein, the strips A, and B, alternately overlapping, substantially as described.

RUDOLPH FAAS.
HERBERT S. GRAY.

Witnesses:
H. C. HUNSBERGER,
S. G. VAN GILDER.